United States Patent
Brown, Jr.

[11] 3,908,288
[45] Sept. 30, 1975

[54] TEACHING DEVICE

[76] Inventor: Cecil Brown, Jr., P.O. Box 1, Friendswood, Tex. 77546

[22] Filed: Nov. 19, 1973

[21] Appl. No.: 417,137

[52] U.S. Cl................ 35/35 C; 84/1.01; 179/1 SM; 360/91
[51] Int. Cl.².................. G09B 5/04; G11B 15/18
[58] Field of Search............... 35/35 C, 35 A, 5, 6; 179/1 SA, 1 SM, 1 SE; 274/18; 360/90, 91; 84/1.01, DIG. 7, 8, 29

[56] References Cited
UNITED STATES PATENTS

| | | | |
|---|---|---|---|
| 3,112,569 | 12/1963 | Moore et al. | 35/5 |
| 3,175,038 | 3/1965 | Mauch | 35/35 A X |
| 3,367,045 | 2/1968 | Mendez | 35/5 |
| 3,372,242 | 3/1968 | Garrett | 35/35 C X |
| 3,624,301 | 11/1971 | Richeson | 179/1 SM |
| 3,794,753 | 2/1974 | Hansen | 179/1 SM |

*Primary Examiner*—Wm. H. Grieb
*Attorney, Agent, or Firm*—Browning & Bushman

[57] ABSTRACT

A teaching device comprising sound recording means on which are recorded a plurality of individual sound units. The sound units are selectively detected and audibly reproduced in any desired sequence upon operation of respective key members. The device comprises means for preventing repetition of each sound unit during one operation of the respective key member.

12 Claims, 8 Drawing Figures

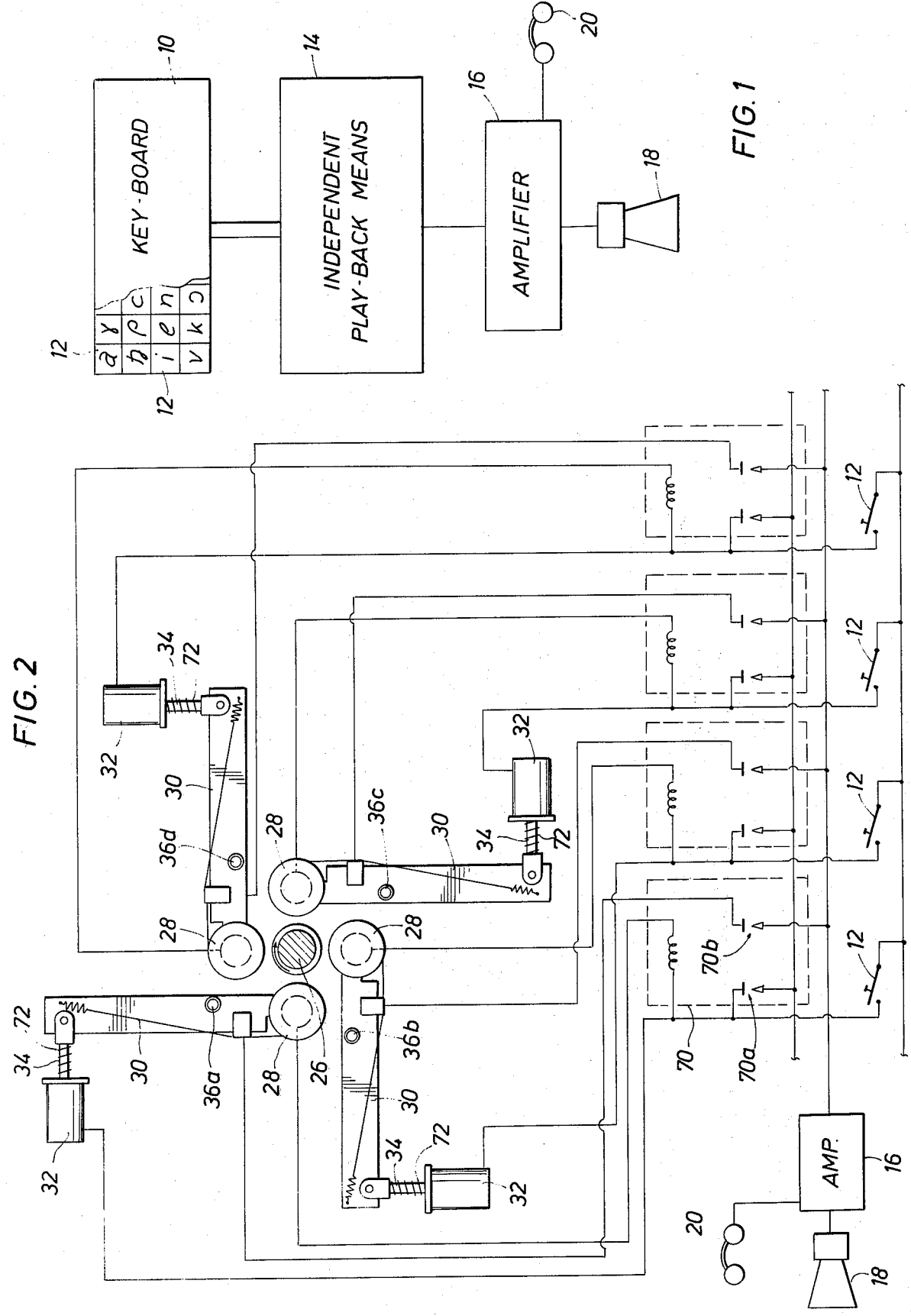

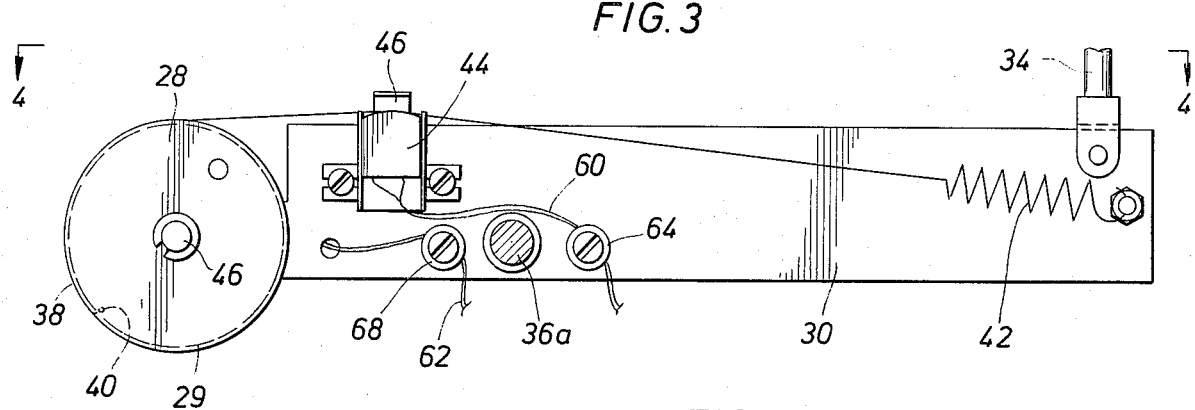
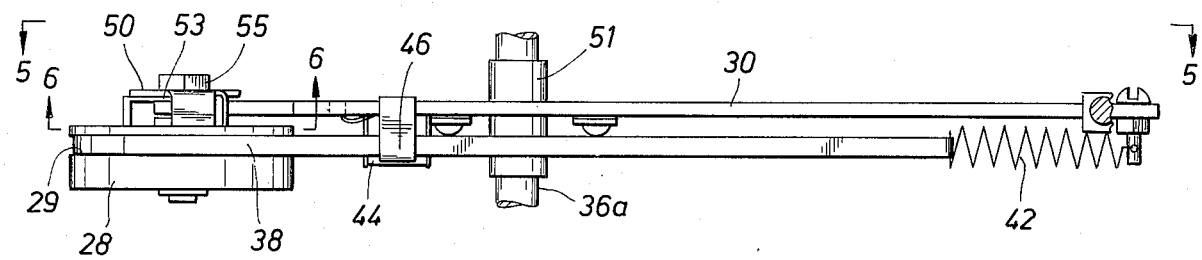
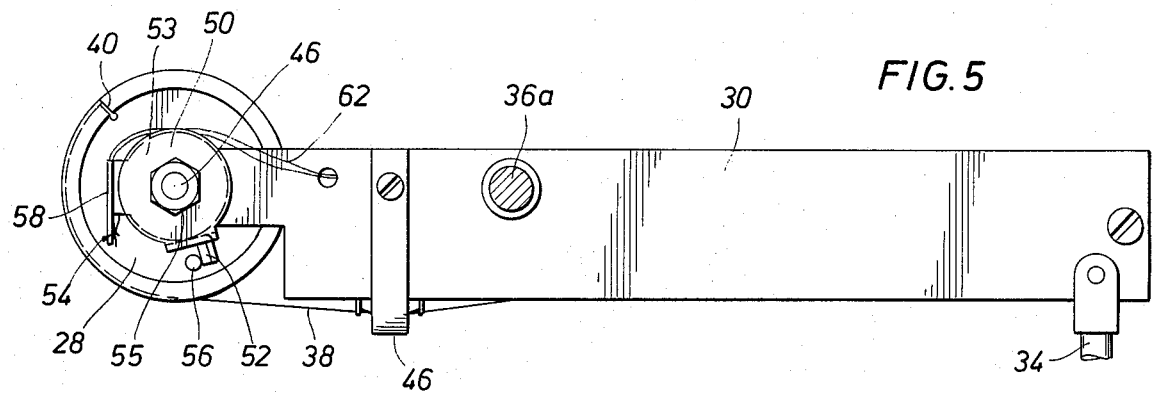
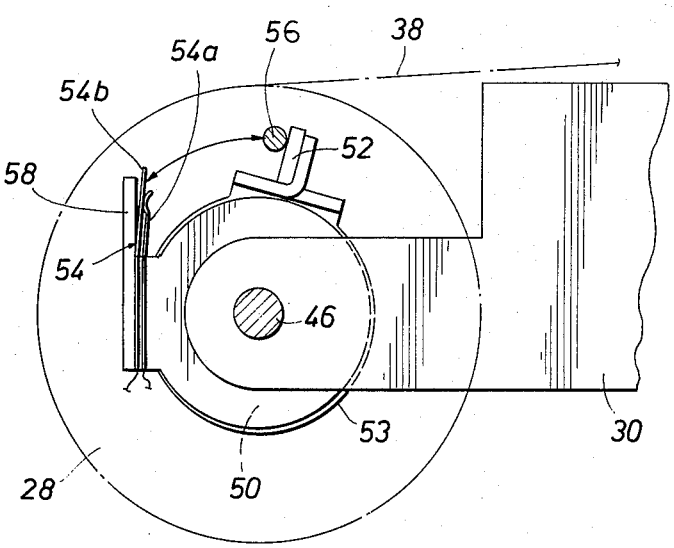

TEACHING DEVICE

BACKGROUND OF THE INVENTION

1. Field of the Invention

The present invention relates to teaching devices for teaching subjects such as languages or music in which it is desirable for the student to hear and reproduce certain sounds. In particular, the device of the invention is useful in allowing the student to synthesize sounds such as words, or musical compositions from individual sound units.

The words of any language may be broken down into basic sound units known as phonemes. Phonemes may include vowels, consonants, dipthongs and diagraphs. In general the words of most languages can be synthesized by various combinations of 44 basic phonemes. In teaching languages it is most desirable that the student be enabled to hear and pronounce the individual phonemes as well as to synthesize, hear and pronounce words composed of these phonemes.

2. Description of the Prior Art

One device for synthesizing phonemes in language instruction is disclosed in U.S. Pat. No. 3,367,045 to Mendez. This device comprises a plurality of sound recording media on continuously rotating disks. Each medium has a phoneme recorded thereon and each disk has a sound detecting head associated therewith. The device also comprises a plurality of keys, each key corresponding to a respective one of the heads. When a key is depressed, the respective head is connected to an amplifier and speaker whereby the phoneme on the associated disk is audibly reproduced.

By depressing appropriate keys in a given sequence words can theoretically be synthesized from the phonemes using the Mendez apparatus. However, in practice several problems are presented. There is little trouble with vowels, nor with consonants such as $n$ and $m$ which may be recorded as one continuous sound on the circular track of the sound recording medium. Then no matter what the relative position of the disk and head, the sound will be heard immediately upon depression of the related key. The sound will be reproduced no matter how quickly the key is depressed and released; and if the key is held in a depressed position, the sound will simply be "held." However, in the case of, for example, explosive consonants such as $t$ and $p$, one or more individual such sound units must be recorded on the sound recording medium as the nature of the sound does not permit its recording continuously over the entire track. Thus there will be blank spots on the track with no sound recorded thereon. When the student depresses the key corresponding to one of these phonemes, there may be a pause before the sound is reproduced depending on whether the head is aligned with a sound unit or a blank spot on the track when the key is depressed. Additionally, if the key is depressed and released too quickly, the phoneme may not be reproduced at all if the head was aligned with a blank spot when the key was depressed. On the other hand, if the student holds the key down too long, the sound will be repeated over and over, since the disk is continuously rotating, and a "stuttering" effect will be produced.

SUMMARY OF THE INVENTION

The teaching device of the present invention comprises sound recording means with a plurality of individual sound units recorded thereon and corresponding key members such as buttons. The device is designed so that each sound unit or phoneme will be reproduced substantially immediately upon depression of the corresponding key member, will be reproduced no matter how quickly the key member is operated and released, and will not be repeated more than once for each operation of the key member no matter how long the key member is held in the operating mode. Thus the synthesis of words can be easily carried out by the student.

The teaching device of the invention comprises a sound recording means with a plurality of individual sound units such as phonemes recorded thereon. The device also comprises sound detecting means for selectively detecting the sound units on the sound recording means. There are preferably a plurality of sound recording means in the form of a plurality of sound recording media, and a plurality of sound detecting members, each in sound detecting disposition with a respective one of the media. An amplifier and sound reproducing means, such as a speaker or set of headphones, are provided for respectively amplifying and audibly reproducing the sound units detected by the sound detecting means. Operatively connected to the sound recording means is an actuator means operated by a plurality of key members, buttons or the like. The actuator means, upon operation of each key member, operatively connects the sound recording means with the sound detecting means whereby a respective individual sound unit is detected.

In a preferred form employing a plurality of sound recording media, each medium remains in a fixed position relative to the sound detecting means when the respective key is not in operation. In order to insure against pauses in the reproduction of a sound unit, or even the omission of the sound unit if the key member is operated and released too quickly, the beginning of the sound unit is preferably located adjacent the sound detecting means. Thus when the key member is operated, no blank spots of significant dimension will pass the sound detecting means, but rather the sound unit will immediately pass the sound detecting means and be reproduced by the amplifier and speaker.

The teaching machine also includes means for preventing repetition of a sound unit during one operation of the respective key member. If, for example, the sound recording medium is mounted on a rotatable wheel with a sound detecting member located adjacent each wheel, the actuator means may operate to rotate the wheel and pass the sound recording along the detecting member. Then stop means may be provided to prevent further rotation of the wheel once the sound unit has passed the detecting member even if the key member is held in the operating position. Return means are provided to return the wheel to its initial position only after the key member is released.

It is therefore an object of the present invention to provide a teaching device capable of synthesizing sounds from individual sound units.

Another object of the invention is to provide such a teaching device in which each sound unit is produced only once for each operation of an associated key member.

A further object of the invention is to provide a teaching device in which a sound unit may be audibly reproduced immediately upon operation of the associated key member.

Still another object of the invention is to ensure the reproduction of a sound unit by a teaching device upon each operation of a key member, no matter how quickly said key member is operated.

Other objects and advantages of the present invention will be made apparent by the following detailed description, the claims, and the drawings.

BRIEF DESCRIPTION OF THE DRAWINGS

FIG. 1 is a schematic diagram of the teaching device of the invention.

FIG. 2 is a modified circuit diagram showing diagrammatically a bottom plan view of one level of sound recording media and sound detecting members with certain of the associated mechanism of the actuating means.

FIG. 3 is a bottom plan view on an enlarged scale of one of the support arms of FIG. 2 with its driven wheel and sound detecting head.

FIG. 4 is a side elevational view of the support arm taken along lines 4—4 in FIG. 3.

FIG. 5 is a top plan view of the support arm taken along lines 5—5 in FIG. 4.

FIG. 6 is a detail view on a further enlarged scale of the driven wheel taken along lines 6—6 in FIG. 4.

DESCRIPTION OF THE PREFERRED EMBODIMENT

Figure 8:
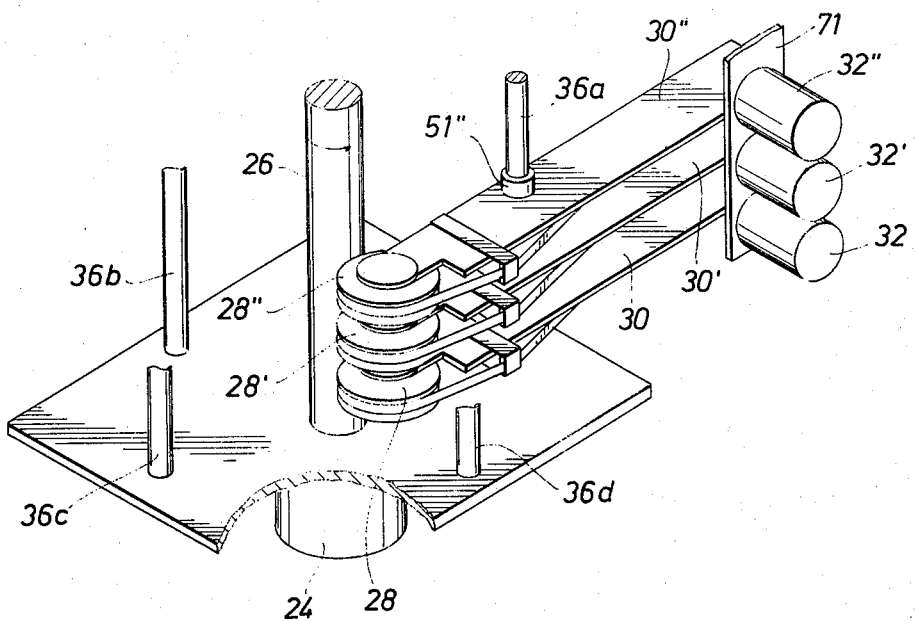
FIG. 8 is a fragmentary elevational view of the device illustrating the stacking of support arms on a plurality of levels.

Referring now to FIG. 1, the teaching device of the present invention generally comprises a keyboard 10 having a plurality of key members 12 which may be pushbuttons, switches, heat sensitive members, capacitance sensitive members, or the like. In the embodiment shown, the key members 12 are pushbuttons similar to ordinary typewriter keys. Each of the key members 12 corresponds to an individual sound unit and bears a symbol for that sound unit. The device is particularly useful in the teaching of languages, and for this use the sound units would be phonemes such as vowels, consonants, dipthongs, and diagraphs. All the words of most languages can be synthesized from 44 basic phonemes. The preferred embodiment of the invention includes 44 key members, one for each phoneme so that the same device can be used to teach many different languages.

It will be readily appreciated, however, that the device can be used for other sound-synthesizing operations. For example, the sound units might be musical notes so that the device could be used to synthesize musical compositions.

Each of the key members 12 operates and forms a part of one of 44 actuator systems, each of which is operatively connected to a sound recording medium having one of the sound units recorded thereon. The 44 actuator systems comprise the actuator means of the device. While in the embodiment shown, there is an individual actuator system for each phoneme, actuator means with systems having some parts in common may be used. However, the actuator means would always include an individual key member for each phoneme. The actuator means and sound recording media, together with suitable sound detecting means comprise independent play-back means 14 for playing back the various sound units in any sequence indicated by the order of operation of the key members 12. The play-back means 14 are suitably connected to an amplifier 16 for amplifying the sound units. Amplifier 16 is in turn connected to a speaker 18 and/or a set of headphones 20 for audibly reproducing the sound units.

Turning now to the remaining figures for a more detailed description, it will be seen that the key members 12 may be connected to a suitable power supply, in this case a DC supply, by closing main switch 22, the power supply serving, by well known means, to supply power to amplifier 16 and motor 24. Motor 24 rotates a drive shaft 26 which when switch 22 is closed, is continuously driven. A plurality of driven wheels 28 surround the drive shaft 26. The driven wheels 28 on one level along the shaft 26 are shown in FIG. 2. Each of the wheels 28 is mounted on one end of a support arm 30, the support arms 30 extending generally tangentially away from the shaft 26 in various directions. A plunger 34 of a solenoid 32 is pivotally connected to the other end of each of the support arms 30 opposite the respective wheel 28. Each of the support arms 30 is pivotally mounted on a respective one of four pivot shafts 36a, 36b, 36c, and 36d. The pivot shafts are journalled in cylindrical spaces 51 welded to the support arms 30 (see FIGS. 4 and 8). Referring to FIG. 8 it will be seen that other support arms 30' and 30'' identical to the support arms 30 and having similar driven wheels 28' and 28'' are also pivotally mounted on the pivot shaft 36a on successive levels to that shown in FIG. 2 and parallel to the arm 30 mounted on pivot shaft 36a on the first level. The parallel support arms 30, 30' and 30'' are spaced apart for stacking on the pivot shaft 36a by their respective spacers (see 51'' and, in FIG. 4, 51). It will be understood that there are eleven levels along the drive shaft 26 and that there are four support arms and driven wheels on each of these levels mounted on respective pivot shafts 36a, 36b, 36c, and 36d parallel to respective ones of the arms 30. Thus there are eleven parallel support arms mounted on each of the pivot shafts. It will be appreciated that many variations of this arrangement are possible depending on the number of sound units required in any given device and also on design preference.

The support arms 30 and driven wheels 28 as well as the identical arms and wheels on the other levels of the device comprise parts of the actuator means. Referring to FIGS. 3–6, each of the driven wheels 28 has an annular groove 29 in the outer surface with a sound recording medium in groove 29 in the form of a segment of magnetic tape 38 having an individual sound unit recorded thereon. The tape 38 has one end secured to the wheel 28 at 40. From attachment point 40 the tape extends partially around the cylindrical outer surface of the wheel and then generally tangentially away from the wheel 28 and has its other end secured to a tension spring 42 mounted on the end of arm 30 opposite wheel 28. An individual sound detecting member such as a tape head 44 is mounted on each of the support arms 30 intermediate its ends. The tape heads 44 comprise the sound detecting means of the device. As the tape 38 passes across the tape head 44 and is held against the head by a padded foot 46, the sound unit is detected in the well known manner.

The wheel 28 is rotatably mounted on the support arm 30 by a pin 46. A pair of disks 50 and 53 are also mounted on pin 46 concentrically with wheel 28. Disk 50 carries a stop 52, and disk 53 carries a normally closed switch 54 and a second stop 58 mounted immediately adjacent switch 54. Switch 54 has contact tines 54a and 54b. The positions of the stop 52 and of the stop 58 and switch 54 can be adjusted by rotating the disks 50 and 53 about pin 46. The disks can then be fixed in a desired position relative to the support arm 30 by tightening nut 55.

It will be appreciated that the spring 42 pulls the tape 38 away from wheel 28 causing the latter to rotate in a clockwise direction as seen in FIG. 6. This rotation of wheel 28 and the movement of the tape 38 toward spring 42 is limited by the stud 56 bearing against stop 52. As will be explained more fully below, the wheel 28 is caused to rotate in a counterclockwise direction (as viewed in FIG. 6) when it is brought into contact with the drive shaft 26, and its movement in this direction is limited by the stud 56 bearing against stop 58 via contact tine 54b. Conductors 60 and 62 are connected respectively to the tape head 44 and the switch 54 and are secured against the support arm 30 by respective clamps 64 and 68.

As noted, an individual sound unit, e.g. phoneme, is recorded on each of the tapes 38. When the wheel 28 and tape 38 are in their normal position, i.e. with stud 56 against stop 52, the sound unit is on that portion of tape immediately to the right of the tape head 44 (as viewed in a FIG. 3) with the beginning of the sound unit immediately adjacent the tape head 44. This is achieved by positioning of stop 52 as described above. The switch 54 and stop 58 are adjusted to a position such that the stud 56 will hit the switch 54 just after the end of the sound unit has passed the tape head 44. Thus no blank spots on the tape 38 will ever pass the tape head 44.

Figure 7:
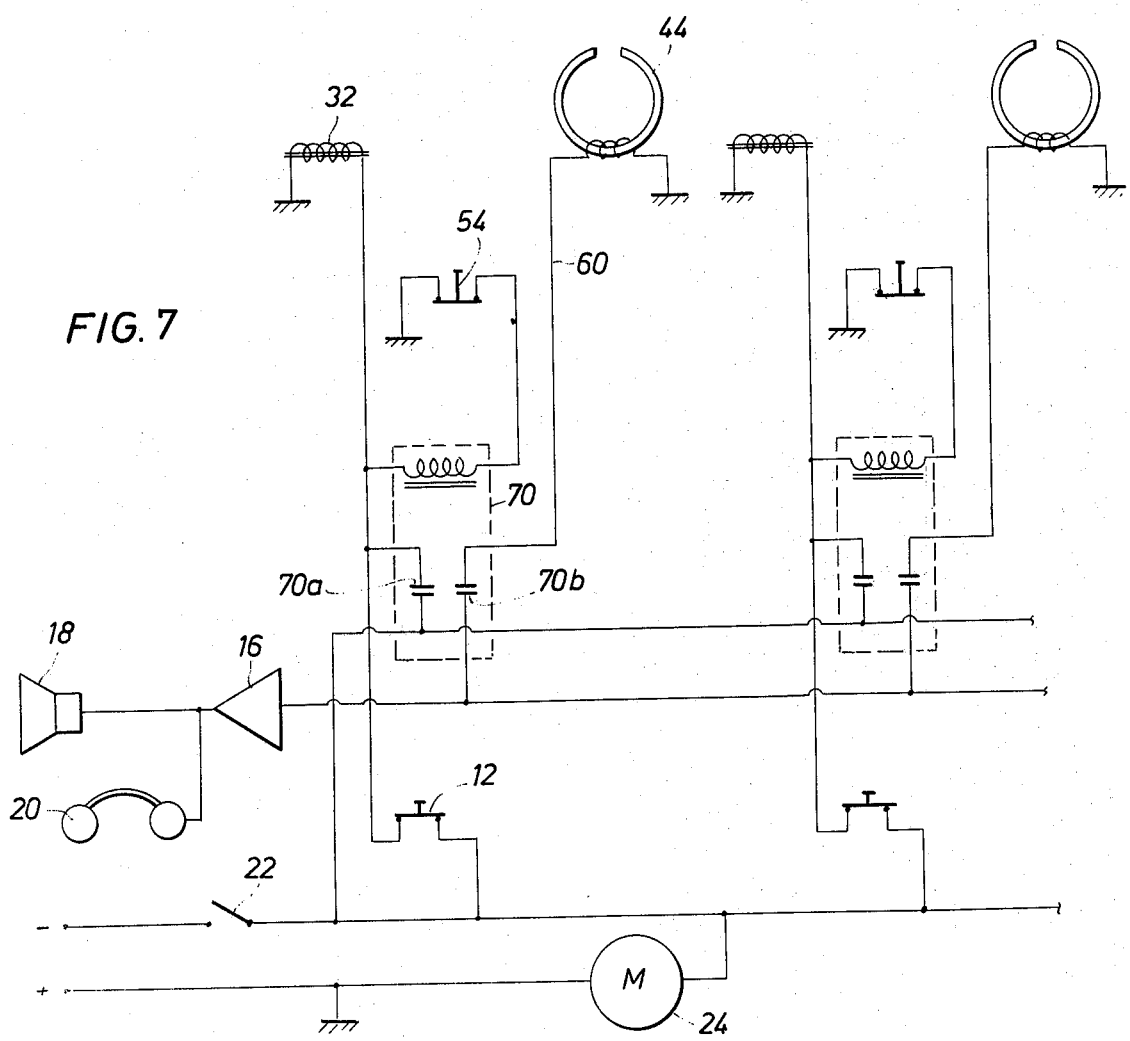
FIG. 7 is a partial circuit diagram of the teaching device.

Referring now to FIGS. 2 and 7, the operation of any one of the individual actuator systems is as follows. With switch 22 closed, when one of the key members 12 is operated, current flows through solenoid 32, latching relay 70, and switch 54 of the particular actuator system in question. The latching relay 70 closes and latches a first pair of contacts 70a and a second pair of contacts 70b. As best seen with reference to FIG. 7, when key member 12 is operated resulting in latching of relay 70, power is supplied to solenoid 32 via two routes, one directly through key 12, the other directly through contacts 70a of latching relay 70. The current flow through solenoid 32 results in plunger 34 being moved so as to cause pivoting of connected support arm 30 about its pivot shaft 36a, 36b, 36c, or 36d, and bringing the respective driven wheel 28 into contact with the drive shaft 26. Groove 29 prevents contact of the tape 38 by the drive shaft 26. Similtaneously the closing of contacts 70b connects the tape head 44 on the same one of the support arms 30 to the amplifier and speaker and/or headphones.

Thus the wheel 28 is driven by the shaft 26 pulling the tape 38 across the tape head 44 so that the sound unit recorded on the tape is reproduced by the speaker or headphones. When the stud 56 reaches switch 54 it separates the contact lines 54a and 54b breaking the circuit through the latching relay 70. The contacts 70a and 70b will open and remain open until key 12 is depressed again. Thus the respective tape head 44 is disconnected from the amplifier and speaker or headphones. The solenoid 32 is deactivated by virtue of the release of key member 12 and opening of contact 70a and a compression spring 72 mounted on solenoid 32 returns the plunger to its extended position similtaneously pivoting support arm 30 away from the drive shaft 26. At the same time spring 42 returns the tape 38 and wheel 28 to their norman positions.

It will be readily appreciated that, because relay 70 is a latching relay, contacts 70a and 70b, once closed, will remain closed until the circuit is broken by stud 56 tripping switch 54 even if the key member 12 is released before the stud reaches the switch. This insures the reproduction of the entire sound unit no matter how quickly the key member 12 is operated and released. On the other hand, if the key 12 is held in the depressed position, the sound unit will still be reproduced only once. As best seen in FIG. 7, operation of key member 12 causes current to flow through solenoid 32 independently of the latching of relay 70. Thus although tripping of switch 54 opens relay 70, power continues to be supplied to solenoid 32 when the key 12 is operated. Thus the solenoid will not be deactivated, but will continue to keep arm 30 in its pivoted position with wheel 28 against drive shaft 26, the former simply slipping on the latter. Nor will the spring 42 retract the tape 30 since the friction of the drive shaft 26 on the driven wheel 28 will continue to urge the stud 56 against the switch 54 and stop 58. This will keep latching relay 70 open thus keeping amplifier 16 and speaker 18 deactivated.

It will also be appreciated that by proper placement of the phoneme on the tape 38 and proper positioning of the stops and switch as described above, no blank spots on the tape of any significant dimension will ever pass the tape head 44 producing a pause in the playback. The length of time between sound units as they are reproduced is limited only by the frequency at which the student operates and releases the key members. This allows an individual student to effectively learn at his own speed. The student can synthesize the phonemes as quickly as he is capable of perceiving and assimilating them. He can also vary the speed as his skill increases. Thus the device of the invention is especially well suited to the teaching of students of various ages, capabilities, backgrounds, etc.

While the above description pertains to any one of the four actuator systems shown for example in FIG. 2, it will be understood that all of the actuator systems on the various levels of the device are identical and operate in the same manner. It will also be appreciated that the individual actuator systems operate indedependently. Thus, for example, two of the systems could be working simultaneously, one just finishing and one just beginning, so that sounds may be synthesized in a continuous, fluid manner.

It should also be understood that while the actuator means of the embodiment shown and described employs electromechanical parts such as solenoids and relays, parts of the actuator means could be pure electronic systems such as are well known in the art.

Additionally, the device may be designed to provide a "record" mode of operation in which the sound units could be recorded on or erased from the recording means in the manner well known in the art. It will be appreciated that in this record mode, adjustments in the positions of the stops can be made as described above to eliminate the possibility of blank spots on the recording media passing the sound detecting means and also to insure detection of the entire sound unit before deactivation of the respective actuator system by tripping of the switch.

It will be understood that the entire device will be housed in a casing and that the solenoids 32 can be mounted on suitable plates such as 71 in FIG. 8. The relays, etc. are similarly mounted in a well known manner.

Many modifications of the preferred embodiment described above are possible. For example, instead of the individual sound recording media, there may be one continuous tape having the individual sound units on various portions and a plurality of tape heads moveable across respective ones of these portions. Another possible modification might be the use of fewer tape heads as opposed to the provision of a tape head for each sound recording medium. These and other modifications which will be apparent to those skilled in the art are within the scope of the invention.

I claim:

1. A teaching device comprising:
   sound recording means having a plurality of individual sound units recorded thereon;
   sound detecting means for selectively detecting the sound units recorded on said sound recording means;
   amplifier and sound reproducing means for amplifying and audibly reproducing the sound units detected by said sound detecting means;
   actuator means comprising a plurality of key members, said actuator means being operatively connected to said sound recording means and to said sound detecting means and including means operative upon operation of each one of said key members to selectively operably connect said sound recording means with said sound detecting means and maintain said connection for a time span at least as long as the duration of a respective one of said sound units without the necessity for operating said key member for said duration to detect said respective one of said sound units irrespective of any prior operation of any of the other key members;
   and means for preventing repetition of each of said sound units during one operation of the respective key member.

2. A teaching device according to claim 1 wherein said sound detecting means comprises a plurality of sound detecting members, each of said sound detecting members being disposed so as to detect a respective one of said sound units.

3. A teaching device according to claim 2 wherein said sound recording means comprises a plurality of sound recording media, each of said sound recording media having a single sound unit recorded thereon.

4. A teaching device according to claim 2 further including a rotatable drive member and a plurality of driven wheels normally spaced from said drive member, each of said driven wheels having one of said sound recording media thereon, said actuator means being operative to bring said drive member and a respective one of said driven wheels into driving relationship.

5. A teaching device according to claim 4 further including a plurality of support arms mounted on pivot means, each of said driven wheels being mounted on one end of a respective one of said support arms, said device further comprising a plurality of electric operator means, each of said electric operator means being operatively connected to a respective one of said support arms and operative to rotate the support arm about said pivot means, and said actuator means including electric circuit means operative upon operation of each of said key members to actuate a respective one of said electric operator means thereby rotating said support arm about said pivot means so as to bring said driven wheel into contact with said drive member.

6. A teaching device according to claim 5 wherein said electric operator means comprise solenoids.

7. A teaching device according to claim 5 further including stop means for preventing further rotation of said driven wheel when said sound unit has passed said sound detecting member.

8. A teaching device according to claim 7 wherein said sound detecting members are magnetic tape heads and said sound recording media are magnetic tapes.

9. A teaching device according to claim 8 wherein said electric operator means comprise solenoids, each of said solenoids being activated by operation of a respective one of said key members.

10. A teaching device according to claim 9 further comprising a plurality of latching relays, operation of each of said key members serving to close a respective one of said latching relays, each of said latching relays upon closing serving to connect a respective one of said sound detecting members to said amplifier and said sound reproducing means, each of said latching relays further providing an alternate circuit to a respective one of said solenoids.

11. A teaching device according to claim 10 wherein each of said support arms has a normally closed switch mounted thereon, each of said switches being connected to a respective one of said latching relays and, upon being opened, serving to open said latching relay, and there are means on each of said driven wheels positioned to open said switch on the support arm on which the driven wheel is mounted when said sound unit has passed said sound detecting member.

12. A teaching device according to claim 2 wherein said actuator means includes a plurality of actuator systems each including a respective one of said key members and each operatively connected to a respective one of said sound detecting members.

* * * * *